United States Patent [19]

Asano

[11] Patent Number: 4,960,011

[45] Date of Patent: Oct. 2, 1990

[54] DIFFERENTIAL DRIVE MECHANISM

[75] Inventor: Hiroaki Asano, Okazaki, Japan

[73] Assignee: Toyoda Koki Kabushiki Kaisha, Kariya, Japan

[21] Appl. No.: 385,429

[22] Filed: Jul. 27, 1989

[30] Foreign Application Priority Data

Jul. 27, 1988 [JP] Japan .................. 63-187159

[51] Int. Cl.$^5$ .......................... F16H 35/04
[52] U.S. Cl. ...................... 74/650
[58] Field of Search ................ 74/711, 650

[56] References Cited

U.S. PATENT DOCUMENTS

| | | | |
|---|---|---|---|
| 2,060,558 | 11/1936 | De Lavaud | 74/650 |
| 2,179,923 | 11/1939 | De Lavaud | 74/650 |
| 2,329,058 | 9/1943 | Knoblock | 74/650 |
| 3,490,312 | 1/1970 | Seitz et al. | 475/88 |
| 3,628,399 | 12/1971 | Seitz et al. | 475/88 |
| 4,012,968 | 3/1977 | Kelbel | 475/88 |
| 4,031,780 | 6/1977 | Dolan et al. | 475/85 |
| 4,721,010 | 1/1988 | Sheldon et al. | 74/650 |
| 4,784,016 | 11/1988 | Masuda et al. | 74/650 |

FOREIGN PATENT DOCUMENTS 176117 12/1947 Japan .

Primary Examiner—Dirk Wright
Attorney, Agent, or Firm—Oblon, Spivak, McClelland, Maier & Neustadt

[57] ABSTRACT

A differential drive mechanism for automotive vehicles includes a rotary housing rotatably mounted within a support casing and being in drive connection with an input shaft, a pair of split drive axles rotatably carried by the rotary housing coaxially with the rotational axis thereof for relative rotation, a pair of axially spaced pistons slidably disposed within a sealed cylindrical chamber in the rotary housing to be axially inwardly moved by a thrust force applied thereto, a pair of axially spaced clutch assemblies disposed between the pistons for transmitting drive torque from the input shaft to the drive axles when engaged by axially inward movement of the pistons, and an annular intermediate element disposed between the clutch assemblies for applying the thrust force acting on one of the clutch assemblies to the other clutch assembly, wherein the thrust force is produced in response to differential rotation between the rotary housing and the drive axles and applied to the pistons.

4 Claims, 3 Drawing Sheets

DIFFERENTIAL DRIVE MECHANISM

BACKGROUND OF THE INVENTION

1. Field of the Invention

The present invention relates to a differential drive mechanism for automotive vehicles, and more particularly to a differential drive mechanism of the type which includes clutch means arranged for transmitting drive torque from an input shaft to a set of road wheels when a speed difference is established between the input shaft and the road wheels.

2. Description of the Prior Art

In operation of a conventional differential gear unit arranged for transmitting drive torque differentially to a set of road wheels, one of the road wheels may not be applied with the drive torque in the event that the other road wheel tends to spin. To eliminate such a drawback, a limited-slip differential in the form of a viscous fluid coupling is assembled within the differential gear unit to limit or control the differential action for positive drive of the road wheels. However, this results in a complicated construction of the differential gear unit.

In U.S. Pat. No. 4,721,010 issued on Jan. 26, 1988, there has been proposed a vehicle drive transmission which comprises first and second drive axle assemblies having respective drive input members and respective road wheels, drive means arranged for delivering drive torque simultaneously to each of the drive input members and with a fixed speed relation therebetween, differential gear means arranged in one of the drive axle assemblies for transmitting drive torque differentially and positively between the associated drive input member and the associated road wheels, and slip coupling means arranged in the other drive axle assembly for transmitting drive torque between the associated drive input member and either associated road wheel when a speed difference exists therebetween. The slip coupling means includes a housing defining an enclosure of generally hollow cylindrical configuration, and three sets of annular plates in the housing, one set of the annular plates being positively engaged with the housing for rotation therewith, the other two sets of annular plates being in positive driving connection respectively with the associated road wheels and being freely interleaved with the annular plates of the one set, and all of the annular plates being sealed within the enclosure in contact with a viscous fluid filled therein.

If in the slip coupling means there is a difference in torque transmission characteristic between the two sets of annular plates, drive torque applied to the associated road wheels will differ. This results in deterioration of the straight-travel stability of the vehicle. During assembly of the slip coupling means, there will inadvertently occur a difference in axial space between the one set of annular plates and the other two sets of annular plates. It is, therefore, very difficult to match the torque transmission characteristics of the two sets of annular plates. In a condition where frictional contact of the road wheels with a road surface frequently changes, there will occur changes of traction of the road wheels. This also results in deterioration of the straight-travel stability of the vehicle. Even if the annular plates are assembled in position without causing any undesired difference in axial space therebetween, there will occur a difference in rise of temperature between the two sets of annular plates. This will cause a difference in torque transmission to the road wheels.

SUMMARY OF THE INVENTION

It is, therefore, a primary object of the present invention to provide an improved differential drive mechanism capable of transmitting drive torque to the associated road wheels without causing any problems described above.

According to the present invention, there is provided a differential drive mechanism for automotive vehicles which comprises a support casing mounted on a body structure of the vehicle, an input shaft rotatably carried on the support casing to be driven by drive torque applied thereto, a rotary housing rotatably mounted within the support casing and being in drive connection with the input shaft, the rotary housing forming a sealed cylindrical chamber therein, a pair of split drive axles arranged coaxially with the rotational axis of the rotary housing for drive connection to a set of road wheels and being rotatably carried by the rotary housing for relative rotation, a pair of axially spaced pistons slidably disposed within the sealed cylindrical chamber of the rotary housing to be axially inwardly moved by a thrust force applied thereto, a pair of axially spaced clutch assemblies disposed between the pistons for transmitting the drive torque from the input shaft to the drive axles when engaged by axially inward movement of the pistons, an annular intermediate element disposed between the clutch assemblies for applying the thrust force acting on one of the clutch assemblies to the other clutch assembly, and means for producing the thrust force in response to differential rotation between the rotary housing and the drive axles and for applying the thrust force to the pistons.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
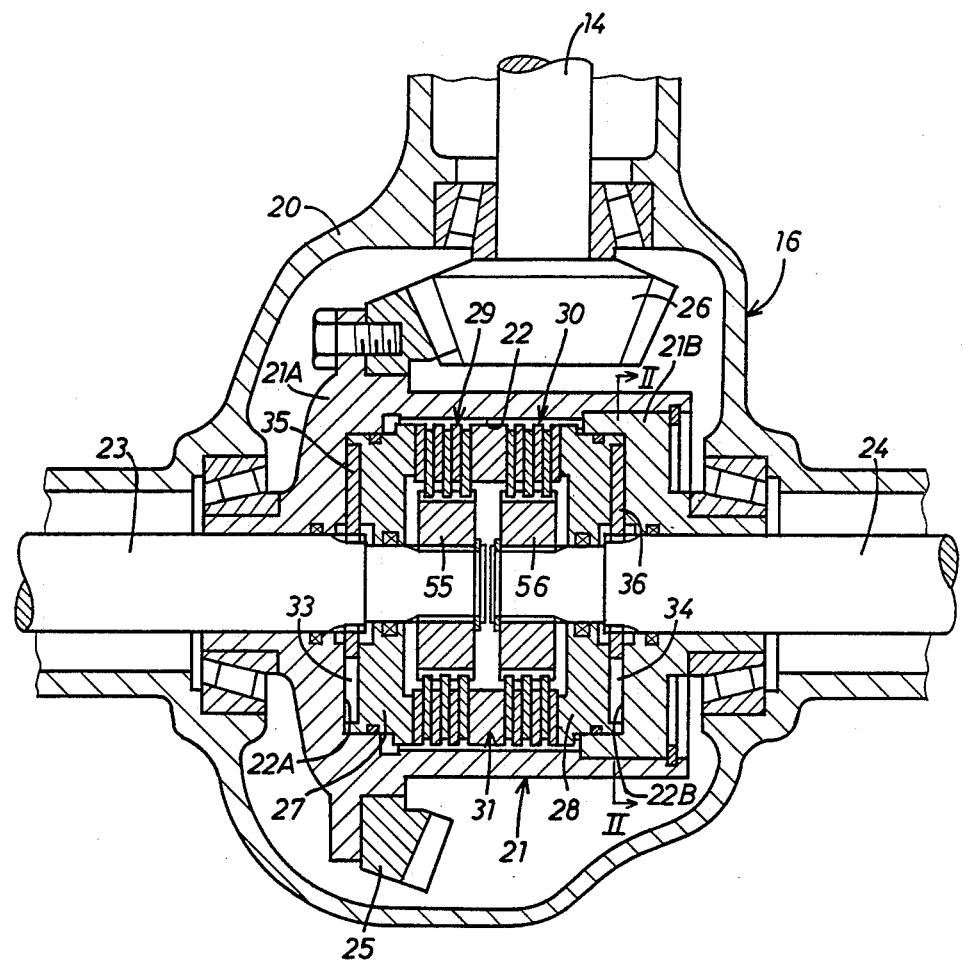
FIG. 1 is a sectional view in plan of a differential drive mechanism in accordance with the present invention.
Figure 3:
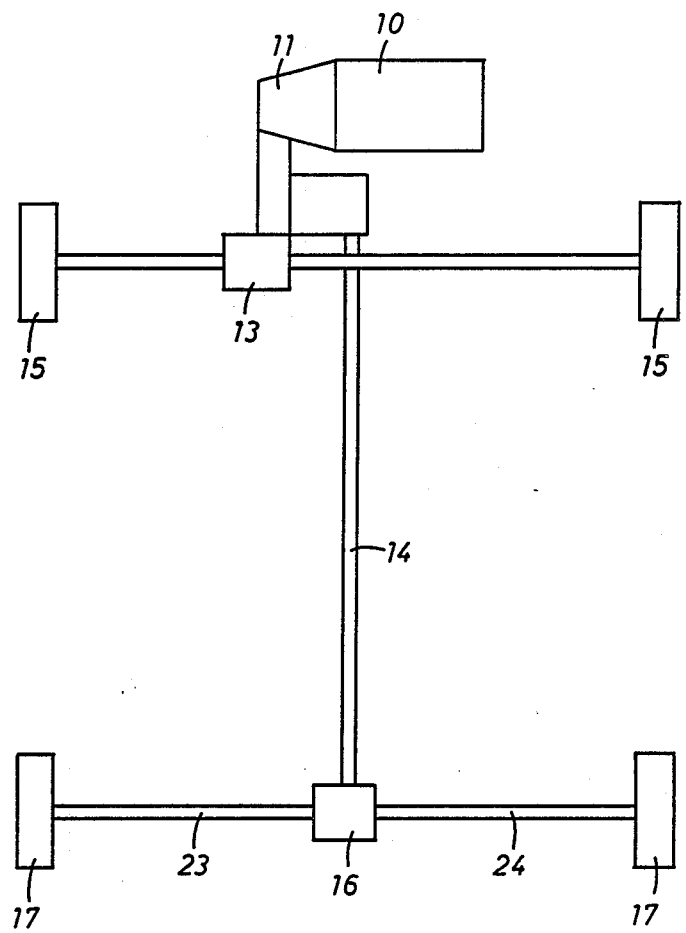
FIG. 3 is a diagramatic illustration of a drive transmission system of a vehicle in which the differential drive mechanism is adapted to transmit drive torque to a set of rear road wheels.

In FIG. 1 of the drawings, there is illustrated a differential drive mechanism 16 according to the present invention which is adapted to such a vehicle drive transmission system as illustrated in FIG. 3. The vehicle drive transmission system includes a power transmission 11 in drive connection to a prime mover 10 of the vehicle, a conventional front differential 13 drivingly connected to the power transmission 11 through a conventional power transfer to transmit drive torque from the power transmission 11 differentially to a set of front road wheels 15, 15 and to permit differential action of the road wheels 15, 15, and a propeller shaft 14 drivingly connected at its front end to the power transmission 11 through the power transfer and at its rear end to the differential drive mechanism 16 to transmit the drive torque from power transmission 11 differentially to a set of rear road wheels 17, 17.

As shown in FIG. 1, the differential drive mechanism 16 includes a stationary support casing 20 fixedly mounted on a floor panel (not shown) of the vehicle, a rotary housing 21 rotatably mounted within the support casing 20 by means of a pair of axially spaced tapered roller bearings carried thereon, and a ring gear 25 secured to the rotary housing 21 for rotation therewith and in mesh with a drive pinion 26 which is integrally provided on the rear end of propeller shaft 14. The rotary housing 21 is composed of a cylindrical housing body 21A and a closure member 21B fixedly coupled within an opening end of housing body 21A in a liquid-tight manner to form a sealed cylindrical chamber 22. A pair of split drive axles 23 and 24 are aligned coaxially with the rotational axis of housing 21 and rotatably carried by the housing 21 for relative rotation. The drive axles 23 and 24 each have an inner end extending into the sealed cylindrical chamber 22 and an outer end in drive connection to each of the rear road wheels 17.

The differential drive mechanism 16 further includes a pair of axially spaced pistons 27 and 28 slidably disposed within the sealed cylindrical chamber 22, a pair of axially spaced frictional clutch assemblies 29 and 30 disposed between the pistons 27 and 28 to be brought into engagement by axially inward movement thereof, and an annular intermediate element 31 disposed between the clutch assemblies 29 and 30. The pistons 27 and 28 are splined at their outer peripheries to an internally splined portion of rotary housing body 21A. The clutch assembly 29 is composed of a set of outer annular plates splined at their outer peripheries to the internally splined portion of rotary housing body 21A and a set of inner annular plates splined at their inner peripheries to an externally splined hub member 55 and freely interleaved with the associated outer annular plates. Similarly, the clutch assembly 30 is composed of a set of outer annular plates splined at their outer peripheries to the internally splined portion of rotary housing body 21A and a set of inner annular plates splined at their inner peripheries to an externally splined hub member 56 and freely interleaved with the associated outer annular plates. The externally splined hub members 55 and 56 are fixedly mounted on the respective inner ends of split drive axles 23 and 24 for rotation therewith. The annular intermediate element 31 is splined at its outer periphery to the internally splined portion of rotary housing body 21A for rotation therewith and positioned between the inner annular plates of the clutch assemblies 29 and 30.

Formed between the piston 27 and the left-hand end wall 22A of sealed cylindrical chamber 22 is an annular cavity 33 which contains therein a rotary member 35 having a hub portion splined to the drive axle 23. Similarly, an annular cavity 34 is formed between the piston 28 and the right-hand end wall 22B of sealed cylindrical chamber 22 to contain therein a rotary member 36 having a hub portion splined to the drive axle 24. As will be described later, the rotary members 35 and 36 each are arranged to apply a thrust force to the pistons 27, 28 in accordance with differential action of the rotary housing 21 relative to the drive axles 23, 24. The rotary member 35 has the same construction as that of the rotary member 36 described below with reference to FIG. 2.

Figure 2:
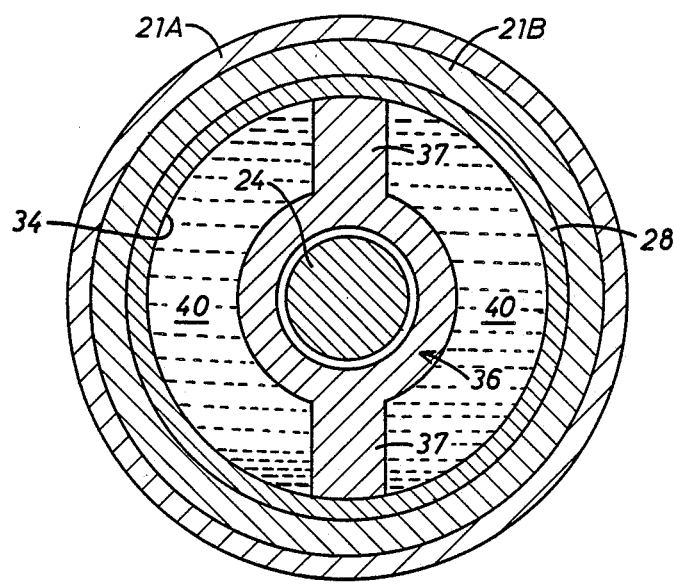
FIG. 2 is an enlarged cross-sectional view taken along line II—II in FIG. 1.

As shown in FIG. 2, the rotary member 36 has a pair of radial blades 37 which are slidably engaged with an internally stepped cylindrical portion of piston 28 to subdivide the interior of annular cavity 34 into a pair of pressure chambers 40. The pressure chambers 40 are filled with a high viscous fluid such as a silicone oil. When the drive axle 24 rotates differentially to the rotary housing 21 during travel of the vehicle, the viscous fluid in pressure chambers 40 is forced by the radial blades 37 of rotary member 36 to flow between the opposed end walls of annular cavity 34 in accordance with a speed difference between the drive axle 24 and rotary housing 21. In this instance, viscous friction of the fluid with the end surfaces of rotary housing 21 and piston 28 causes an internal pressure in chambers 40 in accordance with the rotational speed of radial blades 37.

During normal straight travel of the vehicle, the front differential 13 operates to transmit the drive torque from power transmission 11 to the front road wheels 15, and the propeller shaft 14 operates to rotate the rotary housing 21 of the differential drive mechanism 16 through the ring gear 25 in mesh with the drive pinion 26. In the differential drive mechanism 16, the gear ratio of the ring gear 25 and drive pinion 26 is so selected that during the normal straight travel of the vehicle the rotary housing 21 is driven at the same speed as the drive axles 23, 24 driven by contact with a normal road surface. Thus, any differential rotation does not occur between the rotary housing 21 and the drive axles 23, 24, and the pistons 27, 28 are retained in position.

When the front road wheels 15 tend to spin due to changes of their frictional contact with a road surface, the travel speed of the vehicle decreases to cause a decrease of the rotational speed of the rear road wheels 17. In this instance, the rotary housing 21 is driven at a higher speed than the rotational speed of the drive axles 23, 24. Thus, relative rotation of the radial blades 37 of rotary members 35, 36 to the rotary housing 21 is caused to forcibly flow the viscous fluid between the respective opposed end walls of annular cavities 33, 34 in accordance with a speed difference between the rotary housing 21 and the drive axles 23, 24. As a result, an internal pressure in chambers 40 is created by viscous friction of the fluid in accordance with the differential action, and the pistons 27, 28 are moved axially inwardly by a thrust force applied thereto from the viscous fluid chambers 40 to engage the interleaved annular plates of the clutch assemblies 29, 30. Upon engagement of the clutch assemblies 29, 30, the drive torque from the propeller shaft 14 is transmitted to the rear road wheels 17 through the drive axles 23, 24.

In the event that the internal pressure is created either in the left-hand or right-hand pressure chambers 40, only the piston 27 or 28 is moved axially inwardly by a thrust force applied thereto from the viscous fluid chambers 40 to engage the clutch assembly 29 or 30. In this instance, the intermediate element 31 acts to apply the thrust force to the other clutch assembly 30 or 29 therethrough. Thus, both the clutch assemblies 29 and 30 are simultaneously engaged by the thrust force applied thereto to equally distribute the drive torque from propeller shaft 14 to the drive axles 23 and 24 for transient four-wheel drive. This is useful to enhance the straight-travel stability of the vehicle in the four-wheel drive mode. During travel of the vehicle on road curves or corners, differential action of the rear road wheels 17 is provided by slip between the interleaved annular plates of the clutch assemblies 29 and 30 in rotary housing 21.

Having now fully set forth both structure and operation of a specific embodiment of the concept underlying the present invention, various other embodiments as well as certain variations and modifications of the embodiment shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A differential drive mechanism for automotive vehicles, comprising:

a support casing mounted on a body structure of the vehicle;

an input shaft rotatably carried on said support casing to be driven by drive torque applied thereto;

a rotary housing rotatably mounted within said support casing and being in drive connection with said input shaft, said rotary housing forming a sealed cylindrical chamber therein;

a pair of split drive axles each arranged coaxially with the rotational axis of said rotary housing for drive connection to a set of road wheels and being rotatably carried by said rotary housing for relative rotation;

a pair of axially spaced pistons slidably disposed within the sealed cylindrical chamber of said rotary housing to be axially inwardly moved by a thrust force applied thereto;

a pair of axially spaced clutch assemblies disposed between said pistons for transmitting the drive torque from said input shaft to said drive axles when engaged by axially inward movement of said pistons;

an intermediate element disposed between said clutch assemblies for applying the thrust force acting on one of said clutch assemblies to the other clutch assembly; and a pair of rotary members disposed within a pair of annular cavities formed between said pistons and the opposite end walls of said sealed cylindrical chamber and being mounted on said drive axles for rotation therewith, said rotary members each having at least one radial blade which is slidably engaged with said respective pistons and said respective end walls, and said annular cavities each being filled with a viscous fluid.

2. A differential drive mechanism as claimed in claim 1, wherein said clutch assemblies each are composed of a set of outer annular plates splined at their outer peripheries to an internally splined portion of said rotary housing and a set of inner annular plates splined at their inner peripheries to an externally splined hub member mounted on the associated drive axle for rotation therewith and being freely interleaved with the outer annular plates.

3. A differential drive mechanism as claimed in claim 1, wherein said rotary housing has a ring gear secured thereon and in mesh with a drive pinion integrally provided on said input shaft.

4. A differential drive mechanism as claimed in claim 3, said input shaft is a propeller shaft in drive connection with a power transmission of the vehicle.

* * * * *